Dec. 13, 1955 L. M. C. SEAMARK 2,726,842
GATE VALVES
Filed Oct. 13, 1954 3 Sheets-Sheet 3

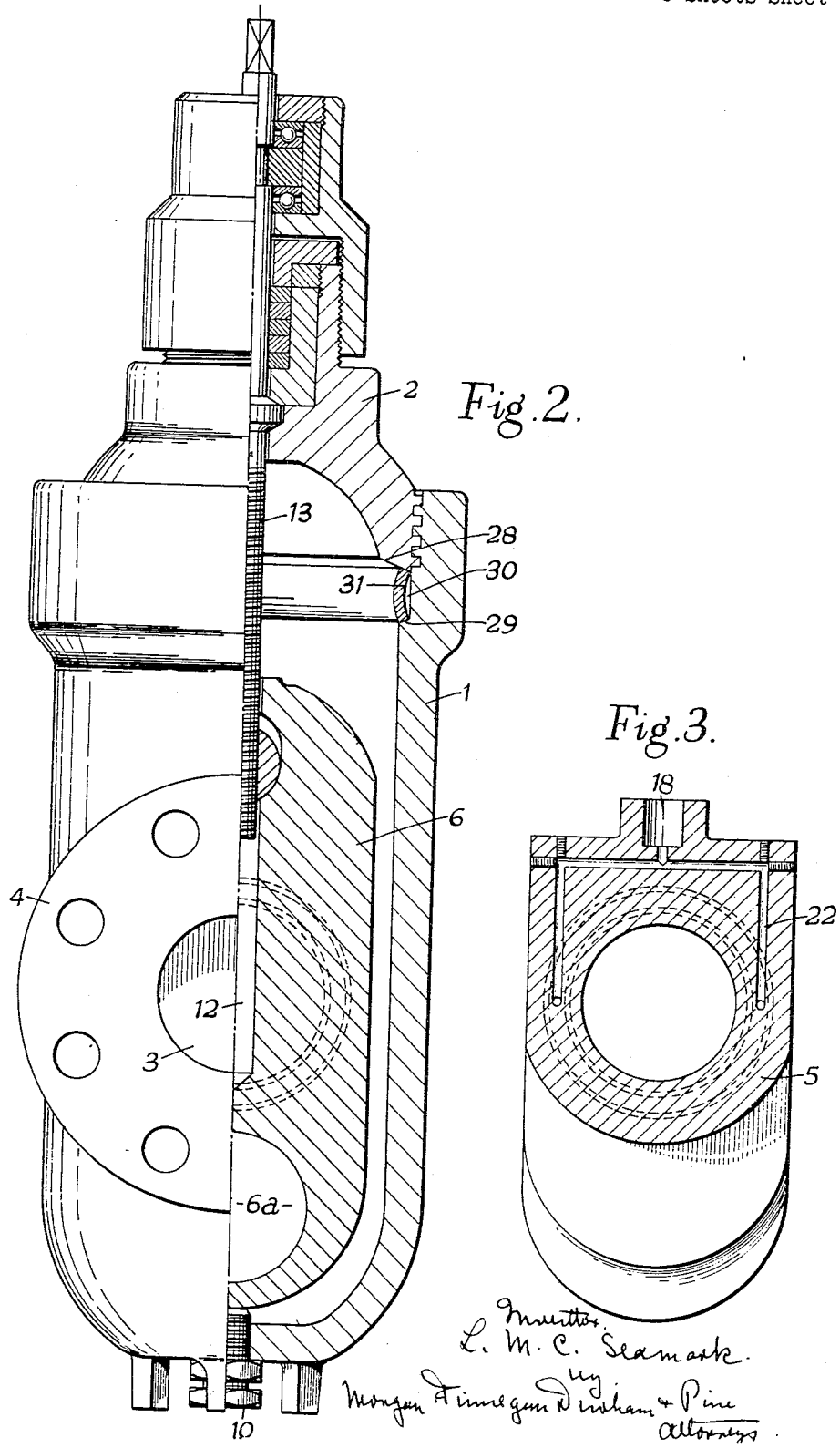

United States Patent Office 2,726,842
Patented Dec. 13, 1955

2,726,842
GATE VALVES

Lewis Mervyn Cecil Seamark, Lyme Regis, England

Application October 13, 1954, Serial No. 462,060

Claims priority, application Great Britain October 13, 1953

5 Claims. (Cl. 251—172)

The invention relates to gate valves.

The invention has among its objects to provide a gate valve which is adapted to operate in both directions of flow of the liquid controlled, while maintaining the sealing faces of the valve element or gate always in contact with the valve seat.

A further object of the invention is to provide a valve which will not bind when opening or closing, due to frictional contact between the sliding surfaces.

According to the invention a gate valve is held in the closed position of the valve under a pressure greater than the fluid pressure in the valve and in which the pressure is applied through slidably mounted members which are caused in the closing movement of the gate to cause a pressure to be applied on opposite sides of the gate in a direction transversely of the opening and closing movements of the gate.

The gate valve according to the invention comprises a valve casing in which is mounted a supporting or mounting member transversely bored for the passage of fluid and vertically bored to receive with sliding fit a gate element of rectangular cross-section movable vertically by means of a screw spindle mounted in known manner to project through the top of the casing, by means of a nut mounted on the spindle and within a slot in the upper part of the gate element, and having lateral flanged parts bearing in the closed position of the valve on the top of pistons drilled vertically and movable in cylinders formed in the support or mounting member, channels connecting the cylinders with grooves formed in circular resilient elements bearing at opposite faces of the gate element on vertically disposed sealing rings mounted in grooves for their reception, in the support or mounting member.

According to the invention furthermore, the pistons are mounted on springs in the cylinders so that the pistons are raised from the cylinders in the upward movement of the flanged nut to open the valve.

According to the invention furthermore, the pipe connecting each cylinder to the groove in the resilient element may be branched laterally and extends as far as the transverse axis of the flow channel, so that the pressure applied will not operate to cause canting of the gate element and will be evenly applied on the opposite lateral surfaces of the gate element.

The invention is diagrammatically illustrated by way of example in the accompanying drawings, in which:

Figure 2 is a half-sectional side elevation;

Figure 3 is a part section taken on the line III—III of Figure 1;

Figure 1:
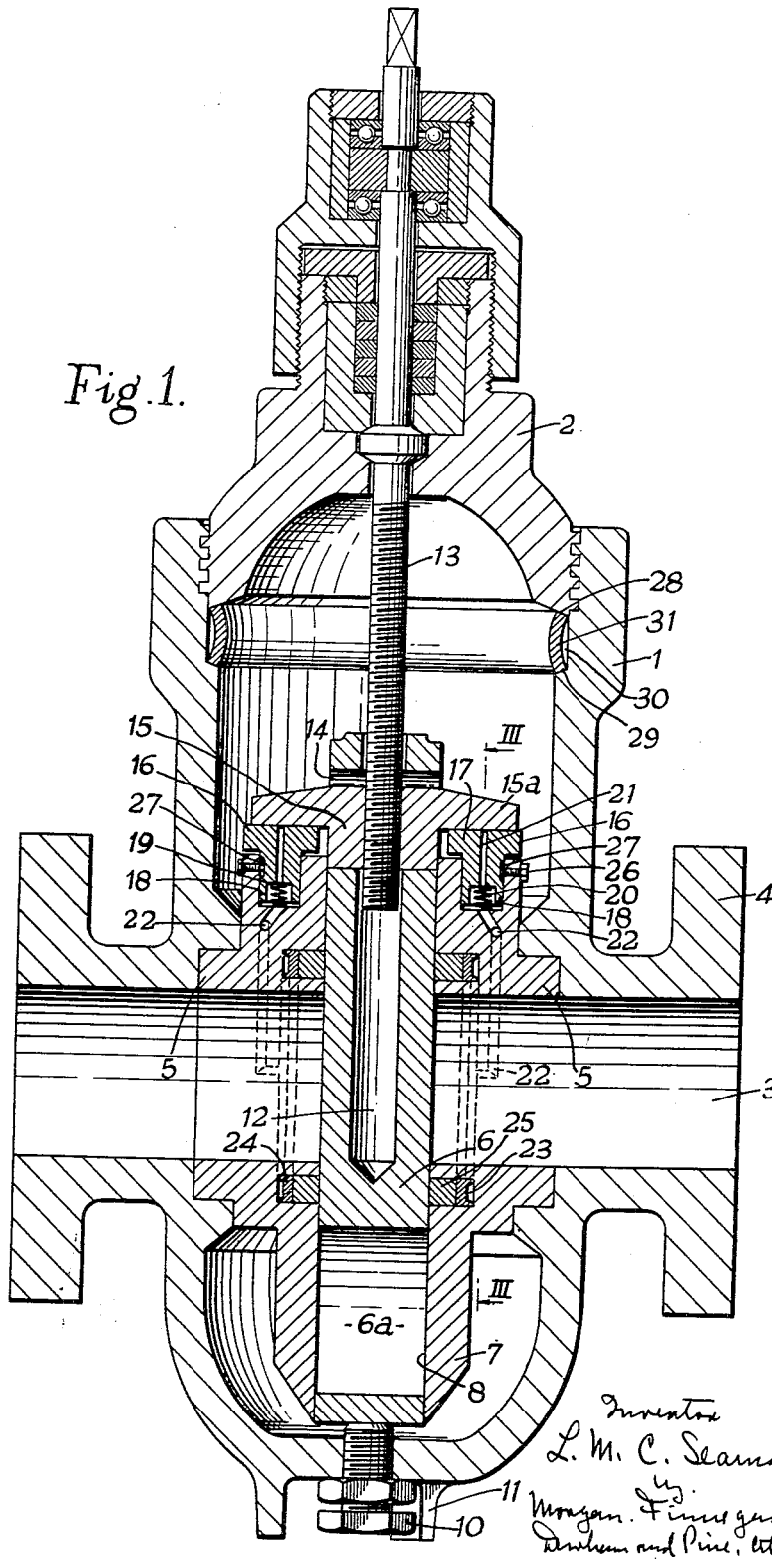
Figure 1 is a sectional front elevation of the valve according to the invention in the closed position of the valve.

In carrying the invention into effect according to the construction illustrated in Figures 1 to 3 of the accompanying drawings, the valve is formed with an elongated casing 1 of circular section, provided with a cap or cover 2 and closed at the bottom, with a transverse channel 3 of circular section for connection at opposite ends of the channel in known manner by annular flanges 4 to the pipe line in which the valve is to be mounted. The casing 1 is cut away at positions above and below the channel 3 to form shoulders serving as seatings for a supporting or mounting part 5 of generally cylindrical section, which serves as a support and guide for the gate element 6 of the valve. The part 5 is formed with a vertical boring of rectangular section to receive the gate element 6 with sliding fit, and being extended at the bottom at 7 to provide a space 8 for the vertical movement of the gate element. The gate element 6 is provided in its lower half with a transverse bore 6a for the passage of fluid when the valve is opened. A screw member 10 is mounted in the bottom of the casing and its end is adapted to bear against the lower end of the gate element 6. The member 10 is adapted to be rotated for the purpose of limiting the downward or inward travel of the gate element 6 in the part 5. On the member 10 is screwed a lock nut.

The valve casing is mounted on three feet 11.

The gate element 6 is formed to a rectangular section, and is formed with a longitudinal cavity or space 12, being provided for the accommodation of the screw-threaded operating spindle 13 which passes through a gland and bearings provided in known manner in the cover 2 of the casing. The spindle is operable in known manner externally of the casing.

At the upper end, the gate element is formed with a transverse slot 14 to receive a nut 15 screw-threaded on the spindle 13 and formed with an annular flange 15a. The flange 15a bears on the enlarged heads 16 of two pistons 17 mounted in cylinders 18 formed at diametrically opposite positions in the upper surface of the part 5.

In the bottom of each piston 17 is formed a chamber 19, open at the bottom to receive a coiled spring 20. The chamber 19 is connected to the space above the part 5 and enclosed by the cover 2 of the valve by vertical borings 21 in the pistons, and is connected by branched channels 22 to a circular groove 23 formed in a circular resilient ring 24 made, for example, of rubber, which is mounted in a groove in the part 5. The ring 24 exerts a pressure on a metal sealing ring 25 provided with the inner face in contact with a face of the gate element.

Similar connections and sealing rings are provided on the opposite face of the gate element.

In operation, downward movement of the flanged nut 15 in the transverse slot 14 in the gate element, effected in known manner by rotation of the valve spindle 13, causes the flange 15a of the nut 15 to bear on the top surfaces of the pistons 17 to seal the liquid in the vertical borings 21 in the pistons and in the connecting channels at the pressure existing in the casing of the valve. The gate element is then at or near the end closed position.

The application of further pressure causes the pistons 17 to be moved downwardly in the cylinders 18 and the liquid to be compressed giving rise at the sealing faces between the rings 25 and the opposite faces of the gate element 6 a sealing pressure higher than the pressure in the valve casing, thus ensuring against any possibility of leakage at the sealing faces.

The pistons 17 are permitted only a limited movement in the cylinders 18 by reason of the screw pins 26 moving in the slots 27 formed in the peripheral walls of the pistons.

In the opening of the valve, the nut 15 moves upwardly in its slot 14. The upward movement allows the pistons 17 to move out of the cylinders 18 under the pressure of the springs 20, thus releasing the pressure on the resilient rings 24 and the sealing rings 25. The gate element 6 then travels to the open position with only the pressure exerted by the resilient sealing ring 24 plus the fluid pressure in the valve casing pressing on the sealing rings 25.

The cap or cover 2 of the casing which is externally screw-threaded to engage the internally screw-threaded end of the upper cylindrical part of the casing, is formed with a bevelled annular shoulder 28 on the inside which co-operates with an outwardly bevelled shoulder 29 formed on the inner wall of the upper cylindrical part of the casing to form an annular cavity 30 with outwardly flared sides. In the cavity 30 is mounted under compression a strip ring 31 bulged inwardly, so that pressure in the valve casing serves to urge the strip into a straight line position, and thus to lock the cover 2 on the casing.

Figure 5:
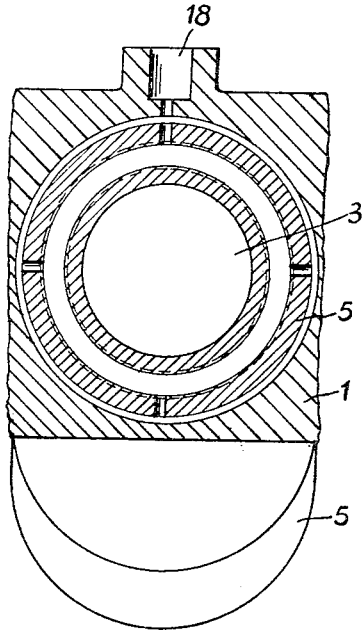
Figure 5 is a part section on the line C—D of Figure 4, looking in the direction of the arrow.
Figure 4:
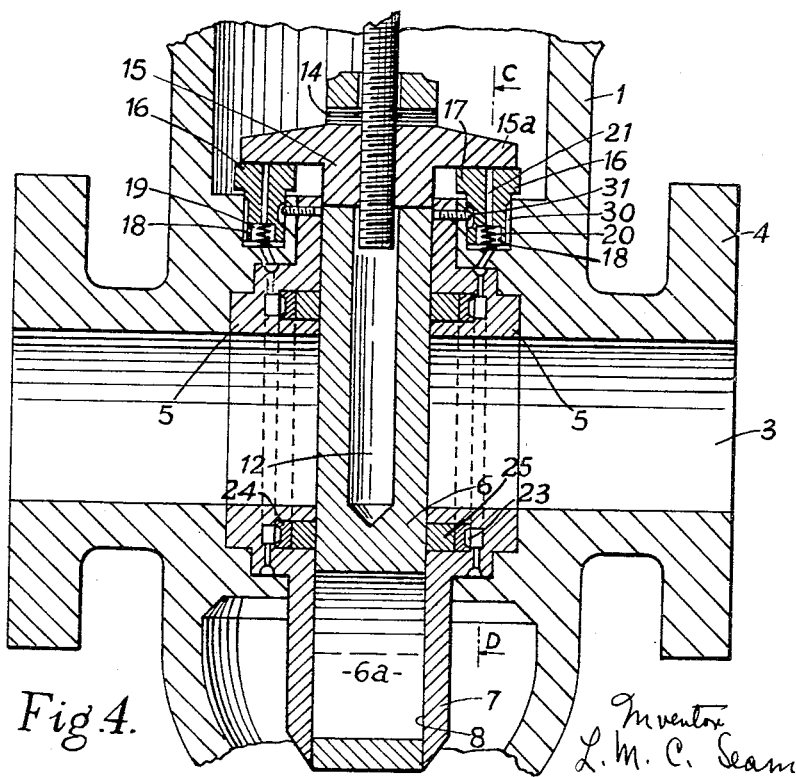
Figure 4 is a sectional elevation of a modified construction.

In the modification illustrated in Figures 4 and 5, the pistons 17 are mounted in the body 1 of the valve and not in the part 5 as in the previous construction described with reference to Figures 1 to 3, thus avoiding the possibility of wear of the part 5, which is made of soft metal, by the movement of the pistons 17.

An additional feature of this modified construction is that the slot 30 is cut into the side of the pistons 17, the slot 30 is positioned in such manner that when the nut 15 forces the pistons 17 downwardly, oil is permitted to escape through the slot 30 until the top of the slot reaches the top edge of the cylinder 18 which cuts-off the escape route for the oil causing the oil to force the sealing rings 25 up against the gate element 6, this movement of the sealing rings 25 being effected before or substantially at the same time as the gate element comes to rest and affords the important advantage that it causes a sweeping movement to wipe the oil from the face element 6, and thus effects a better seal.

The sealing rings 25 may be made of any suitable material to suit the particular use to which the valve is to be put.

In this construction the limiting means 26, 27 are substituted by a grub-screw 31 which can be inserted in a cavity formed to receive it in the supporting part of the piston 17 on the opposite side of the slot 30.

I claim:

1. A gate valve comprising a valve casing, a supporting member mounted in the casing and transversely bored for passage of fluid and vertically bored to receive with sliding fit a gate element of rectangular cross-section movable vertically by means of a screw spindle mounted to project through the top of the casing, by means of a nut mounted on the spindle and within a slot in the upper part of the gate element, laterally flanged parts bearing in the closed position of the valve on the top of pistons drilled vertically and movable in cylinders formed in the supporting member, channels connecting the cylinders with grooves formed in circular resilient elements bearing at opposite faces of the gate element on vertically disposed sealing rings mounted in grooves for their reception in the supporting member.

2. A gate valve according to claim 1 in which the pistons are mounted on springs in cylinders so that the pistons are raised from the cylinder in the upper movement of the flanged part to open the valve.

3. A gate valve according to claim 1, in which the channel connecting each cylinder to the groove formed in the resilient element is laterally branched and extends as far as the transverse axis of the flow channel, so that the pressure applied will not operate to cause canting of the gate element and will be evenly applied on the opposite lateral surfaces of the gate element.

4. A gate valve according to claim 1, in which the pistons are mounted in the body of the valve.

5. A gate valve according to claim 1, in which a slot is cut into the side of the piston for the purpose specified.

No references cited.